United States Patent [19]

Vilasagar et al.

[11] Patent Number: 5,302,646
[45] Date of Patent: Apr. 12, 1994

[54] LOW GLOSS FLAME-RETARDED POLYCARBONATE/ABS BLENDS OBTAINED BY USING HYDROXYALKYL (METH) ACRYLATE FUNCTIONALIZED ABS

[75] Inventors: Shripathy Vilasagar; Herbert S. Rawlings, both of Parkersburg, W. Va.

[73] Assignee: General Electric Company, Pittsfield, Mass.

[21] Appl. No.: 843,661

[22] Filed: Feb. 28, 1992

[51] Int. Cl.$^5$ .................. C08K 5/521; C08L 69/00
[52] U.S. Cl. .................. 524/127; 524/140; 524/141; 525/67
[58] Field of Search .......... 524/127, 140, 141; 525/67

[56] References Cited

U.S. PATENT DOCUMENTS

| | | |
|---|---|---|
| 3,914,335 | 10/1975 | Tugukuni et al. |
| 4,034,013 | 7/1977 | Lane . |
| 4,317,891 | 3/1982 | Sakano ........................ 525/66 |
| 4,444,950 | 4/1984 | Sakano et al. ............... 525/67 |
| 4,500,679 | 2/1985 | DuFour ........................ 525/64 |
| 4,526,926 | 2/1985 | Weber et al. ................. 525/67 |
| 4,554,315 | 11/1985 | Chung et al. ................. 525/67 |
| 4,569,969 | 2/1986 | Jones et al. .................. 525/67 |
| 4,692,488 | 9/1987 | Kress ........................... 524/140 |
| 4,739,010 | 4/1988 | McKee et al. ................ 525/67 |
| 4,774,286 | 9/1988 | Taubitz et al. ............... 525/67 |
| 4,886,855 | 12/1989 | Parsons ........................ 525/67 |
| 4,983,658 | 1/1991 | Kress ........................... 525/67 |

FOREIGN PATENT DOCUMENTS 0463368 1/1992 European Pat. Off. .
059258 4/1983 Japan .

Primary Examiner—David Buttner
Attorney, Agent, or Firm—Andrew C. Hess

[57] ABSTRACT

A thermoplastic blend composition is provided containing an aromatic polycarbonate, a phosphate flame retardant and a hydroxy functional graft copolymer. The compositions exhibit flame retardancy and low gloss and are useful as molding resins.

7 Claims, No Drawings

LOW GLOSS FLAME-RETARDED POLYCARBONATE/ABS BLENDS OBTAINED BY USING HYDROXYALKYL (METH) ACRYLATE FUNCTIONALIZED ABS

BACKGROUND OF THE INVENTION

1. Field of the Invention

The present invention relates to flame retardant blends of aromatic polycarbonate resin and a graft polymer, and more particularly relates to flame retardant polymer blend compositions comprising an aromatic polycarbonate, a phosphate flame retardant compound and functionalized graft copolymer which reduces the gloss exhibited by the compositions.

2. Description of the Related Art

Blends of polycarbonate resin and ABS resin are known, see for example, German Patent 1,170,141 and flame retardant blends comprising polycarbonate resin, ABS resin and a phosphate flame retardant are known—many flame retardant polycarbonate resin/ABS resin blends however exhibit high levels of gloss while in various applications it is desired that the blends exhibit low surface gloss.

SUMMARY OF THE INVENTION

The present invention provides low surface gloss flame retarded PC/graft polymer blends. The blends comprise aromatic polycarbonate resin, a phosphate flame retardant, a functionalized graft copolymer which is preferably a functionalized ABS resin, and wherein the ABS resin is functionalized with an amount of a hydroxyalkyl (meth)acrylate sufficient to reduce the gloss of the blend.

DETAILED DESCRIPTION OF THE INVENTION

The polymer blend compositions of the invention comprise an aromatic polycarbonate resin, a phosphate flame retardant and a hydroxy functional graft polymer. The blends exhibit a relatively low level of gloss compared to similar blends lacking the hydroxy functional graft polymer.

The polycarbonate component included in the blend compositions may be any aromatic homopolycarbonate or co-polycarbonate known in the art. The polycarbonate component may be prepared in accordance with any of the processes generally known in the art, for example, by the interfacial polycondensation process, polycondensation in a homogeneous phase or by transesterification. These processes and the associated reactants, polymers, catalysts, solvents and conditions are well known in the art and are described in U.S. Pat. Nos. 2,964,974; 2,970,137; 2,999,835; 2,999,846; 3,028365; 3,153,008; 3,187,065; 3,215,668; 3,258,414 and 5,010,162, all of which are incorporated herein by reference. Suitable polycarbonates are based, for example, on one or more of the following bisphenols: dihydroxy diphenyls, bis-(hydroxyphenyl)-alkanes, bis-(hydroxyphenyl)-cycloalkanes, bis-(hydroxyphenyl)sulphides, bis-(hydroxyphenyl)ethers, bis-(hydroxyphenyl)-ketones, bis-(hydroxyphenyl)-sulphoxides, bis-(hydroxyphenyl)sulphones, alkyl cyclohexylidene bisphenols, bis-(hydroxyphenyl)diisopropyl benzenes, and their nucleus-alkylated and nucleus-halogenated derivatives, and mixtures thereof.

Specific examples of these bisphenols are 4,4'-dihydroxy diphenyl, 2,4-bis-(4-hydroxyphenyl)-propane, 2,4-bis-(4-hydroxyphenyl)-2-methyl butane, 1,1-bis-(4-hydroxyphenyl)-cyclohexane, a,a-bis-(4-hydroxyphenyl)-diisopropyl benzene, 2,2-bis(3-methyl-4-hydroxyphenyl)propane, 2,2-bis-(3-chloro-4-hydroxyphenyl)propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methyl butane, 1,1-bis-(3,5-dimethyl-4-hydroxyphenyl)cyclohexane, a,a-bis-(3,5-dimethyl-4-hydroxyphenyl)-p-diisopropyl benzene, 2,2-bis-(3,5-dichloro-4-hydroxyphenyl)-propane and 2,2-bis-(3,5-dibromo-4-hydroxyphenyl)-propane. A particular preferred bisphenol is 2,2-bis-(4-hydroxyphenyl)-propane, more commonly known as bisphenol A. The bisphenols may be reacted with phosgene to produce the aromatic polycarbonates.

The hydroxy functional graft polymer formed by grafting a monovinyl aromatic monomer, a hydroxy vinyl monomer, and at least one additional monomer selected from the group consisting of an ethylenically unsaturated nitrile, an acrylic acid ester and mixtures thereof onto a diene rubber substrate to yield a hydroxy functional graft polymer comprising a hydroxy functional rigid polymer grafted to a diene rubber substrate. In a preferred embodiment, the hydroxy functional graft polymer is formed from hydroxy ethyl methacrylate, styrene, acrylonitrile and a polybutadiene rubber substrate. The hydroxy functional graft polymer may be prepared according to methods well known in the art for preparing ABS resins. The compositions may comprise amounts of non-functional graft polymer, wherein the non-functional graft polymer may be made in the same fashion as the functional graft polymer but lacks the hydroxyvinyl component.

The hydroxy functional polymer which is included in the compositions of the invention is formed by grafting a monovinyl aromatic monomer, a hydroxy vinyl monomer, and at least one monomer selected from the group consisting of an ethylenically unsaturated nitrile, an acrylic acid ester and mixtures thereof onto a rubber substrate. The rubber substrate is formed from at least one diene monomer of the formula:

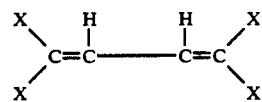

wherein X is selected from the group consisting of hydrogen, alkyl groups containing from 1 to 5 carbon atoms, chlorine and bromine. Examples of the diene monomer include butadiene, isoprene, 1,3-heptadiene, methyl-1, 3-pentadiene, 2-ethyl-1,3-pentadiene, mixtures thereof and the like. Preferably, the diene monomer comprises butadiene, wherein the rubber substrate comprises a polybutadiene substrate. Alternatively, at least one additional styrene monomer may be included in the rubber substrate, thereby forming, for example, a styrene-butadiene rubber substrate. Preferably the rubber substrate is formed from at least 50 weight percent 1,3-butadiene based on the total weight of the rubber substrate. Although the functionalized graft copolymer may include the rubber substrate and the hydroxy functional grafted portion in any ratio which is desired, it is preferred that the graft copolymer comprises at least 40 weight percent of the rubber substrate, and more preferably at least 50 weight percent of the rubber substrate based on the total weight of the graft copolymer.

The grafted portion of the graft copolymer is preferably formed from a hydroxyalkyl (meth)acrylate and at least one styrene monomer and at least one additional monomer. The at least one styrene monomer may comprise unsubstituted styrene monomer, substituted styrene monomer, or mixtures thereof. Substituted styrene monomers may include substituents on the aromatic portion and/or the vinyl portion, with preferred substituents being selected from the group consisting of alkyl groups of from 1 to 5 carbon atoms and halogen atoms such as chlorine and bromine. Preferred styrene monomers include unsubstituted styrene, alphamethylstyrene, dibromostyrene, and mixtures thereof. The at least one additional monomer which is employed in forming the grafted portion is preferably selected from the group consisting of acrylonitrile, methacrylonitrile, alkyl (meth)acrylates, maleic anhydride, maleimide, alkyl maleimides and aryl maleimides. In a preferred embodiment, the functional grafted portion is formed from a hydroxyethyl methacrylate, styrene monomer and acrylonitrile, with the styrene and acrylonitrile being employed in a weight ratio of from 9:1 to 1:9 and preferably from 5:1 to 1:1.

The functionalized graft copolymer may be formed by any of the methods well known in the art for the formation of ABS graft copolymers. For example, the functionalized graft copolymer may be formed by emulsion polymerization wherein the hydroxyalkyl (meth)acrylate, the at least one styrene monomer and the at least one additional monomer are polymerized in the presence of the rubber substrate. Such a process may result in the formation of the hydroxy functional graft copolymer and a rigid polymer of the hydroxyalkyl (meth)acrylate, the at least one styrene monomer and the at least one additional monomer, wherein the rigid polymer does not contain a rubber substrate.

The unsubstituted styrene may be replaced in whole or in part by other vinyl aromatic monomers, such as alpha methyl styrene, chlorostyrene, bromostyrene, p-methyl styrene and vinyl toluene. The hydroxy vinyl monomer is preferably a hydroxyalkyl (meth)acrylate and is more preferably hydroxyethyl methacrylate and is included in the functionalized ABS resin in an amount sufficient to reduce the gloss of the blend. The hydroxyalkyl (meth)acrylate component may be selected from hydroxy alkyl methacrylates and hydroxy alkylacrylate monomers. The acrylonitrile component may be replaced in whole or in part by methacrylonitrile.

The phosphate flame retardant compound which is included in the polymer blend compositions of the present invention may comprise any of such compounds which are known in the art for use in polymer systems. Suitable phosphate flame retardant compounds include monophosphate compounds and diphosphate compounds. Suitable flame retardants comprise aryl phosphates, triaryl phosphates, alkylaryl phosphates and trialkyl phosphates. Examples of suitable phosphates include triphenyl phosphate, isopropyl triphenyl phosphate, and resorcinol diphosphate.

The polymer blend compositions of the present invention include the three essential components, namely, the aromatic polycarbonate polymer, the hydroxy functional graft polymer, and the phosphate flame retardant compound in amounts which provide the compositions with good physical properties, good flame retardant properties and reduced gloss. Preferably, the hydroxy functional graft polymer is included in an amount sufficient to reduce the gloss of the compositions as measured by the Gardner Gloss test.

The hydroxy functional graft polymer is preferably formed by grafting a hydroxy monovinyl monomer, a monovinyl aromatic monomer, and at least one additional monomer selected from the group consisting of an ethylenically unsaturated nitrile, an acrylic acid ester and mixtures thereof onto a diene rubber substrate. Preferably the hydroxy vinyl monomer is present at a level of from 1 to 20 weight percent based on the total weight of the hydroxy functional graft polymer, is more preferably present at a level of from 2 to 10 weight percent thereof, and is most preferably present at a lever of from 3 to 5 weight percent thereof. Preferably the monovinyl aromatic monomer is present at a level of from 10 to 80 weight percent based on the total weight of the hydroxy functional graft polymer, more preferably from 20 to 75 weight percent thereof, and most preferably from 30 to 35 weight percent thereof. Preferably one additional monomer, such as ethylenically unsaturated nitrile or acrylic acid ester, is present at a level of from 0 to 50 weight percent based on the total weight of the hydroxy functional graft polymer, more preferably from 5 to 40 weight percent thereof, and most preferably from 10 to 15 weight percent thereof. Preferably the rubber substrate is present at a level of from 10 to 85 weight percent based on the total weight of the hydroxy functional graft polymer, more preferably from 15 to 70 weight percent thereof, and most preferably from 45 to 55 weight percent thereof.

The composition of the present invention preferably comprises from 10 to 85 percent aromatic polycarbonate based on the total weight of the composition, more preferably 50 to 85 weight percent thereof and most preferably 60 to 70 weight percent thereof; preferably the hydroxy functional graft polymer is present at a level of from 5 to 60 weight percent based on the total weight of the composition; more preferably from 5 to 25 percent by weight thereof; and most preferably from 10 to 15 percent by weight thereof. Total polybutadiene rubber content is preferably at a level of at least 25 percent by weight based on the total weight of the compositions and preferably from 25 to 50 weight percent thereof. The compositions preferably comprise a phosphate flame retardant at a level of from 1 to 25 weight percent based on the total weight of the composition, more preferably from 5 to 20 weight percent thereof, and most preferably from 10 to 15 weight percent thereof. The compositions may also contain amounts of rigid copolymer, for example, from 5 to 40 weight percent based on the total weight of the composition; and may contain amounts of non-functionalized graft polymer at a level of from 0 to 50 weight percent based on the total weight of the composition, for example from 1 to 45 weight percent non-functionalized graft polymer or may be free of non-functionalized graft polymer.

The thermoplastic compositions of the invention may be produced according to conventional methods employing conventional mixing and compounding apparatus including, for example, single and twin-screw extruders, mixing rolls and internal mixers. The thermoplastic compositions may also include various conventional additives including, among others, stabilizers, lubricants, flow aids, mold release agents, antioxidants, antistatic agents, fillers, glass fibers, pigments and the like. Flame retardant synergists such as antimony compounds such as antimony oxides may be included in the compositions.

The thermoplastic compositions according to the present invention are demonstrated by the following example in which parts and percentages are by weight percent of based on the total weight of the composition unless otherwise specified.

| Examples | A | 1 | 2 |
|---|---|---|---|
| PC | 62.25 | 62.25 | 62.25 |
| SAN | 12.5 | 12.5 | 12.5 |
| nfABS | 10.5 | — | — |
| ABS-H5* | — | 10.5 | — |
| ABS-H3* | — | — | 10.5 |
| RDP | 13.0 | 13.0 | 13.0 |
| PTFE | 1.0 | 1.0 | 1.0 |
| Gardner Gloss (60°) | 93 | 53 | 55 |
| Flammability UL-94V @ 0.090" | | | |
| Class | V-0 | V-0 | V-0 |
| Avg Burn | 1.2 | 2.5 | 1.9 |
| Max Burn | 2 | 7 | 5 |
| # Drips | 0/5 | 0/5 | 0/5 |
| Izod Impact, Notched, ⅛' (ft-lb/in) | | | |
| RT | 7.1 | 8.9 | 10.3 |
| 0° F. | 2.4 | 2.3 | 2.6 |
| −40° F. | 2.0 | 1.7 | 1.7 |

*ABS H3 and -H5 indicate an ABS high rubber graft copolymer with 3 and 5 weight percent, respectively, of HEMA based on the total weight of the functional ABS graft polymer.

ABS H3 is a HEMA-SAN-PBD graft polymer comprising polybitadiene rubber substrate having HEMA-SAN rigid graft polymer grafted. The ABS-H3 comprised polybutadiene rubber substrate present at a level of 50 weight percent based on the total weight of the functionalized graft polymer and HEMA-SAN graft portion present at a level of 50 weight percent based on the total weight of the functionalized polymer. The styrene was present at a level of 35 weight percent based on the total weight of the functionalized graft polymer; the acrylonitrile was present at a level of 12 weight percent based on the total weight of the functionalized graft polymer; and the hydroxy ethyl methacrylate is present at a level of 3 weight percent based on the total weight of the functionalized graft polymer.

ABS H5 is a HEMA-SAN-PBD graft polymer comprising polybutadiene rubber substrate having HEMA-SAN rigid graft polymer grafted. The ABS-H5 comprised polybutadiene rubber substrate present at a level of 50 weight percent based on the total weight of the functionalized graft polymer and HEMA-SAN graft portion present at a level of 50 weight percent based on the total weight of the functionalized polymer. The styrene was present at a level of 33 weight percent based on the total weight of the functionalized graft polymer; the acrylonitrile was present at a level of 12 weight percent based on the total weight of the functionalized graft polymer; and the hydroxy ethyl methacrylate is present at a level of 5 weight percent based on the total weight of the functionalized graft polymer.

In the example, the polycarbonate is a reaction product of bisphenol-A and phosgene, the functionalized ABS is a functionalized graft polymer containing hydroxyethyl methacrylate styrene-acrylonitrile terepolymer grafted on butadiene rubber particles, SAN 1 is a styrene-acrylonitrile rigid copolymer (72 wt % S and 28 wt % AN), nfABS is a graft polymer of styrene and acrylonitrile grafted on butadiene rubber particles (36 wt % Styrene and 14 wt % acrylonitrile, 50 wt % 1,3-butadiene rubber based on the total weight of the ABS; the phosphate flame retardant is resorcinol diphosphate, PTFE is poly tetrafluoroethylene. The HEMA functionalized ABS was prepared by an emulsion process. Gardner gloss is measured by ASTM D2457. Examples A, 1 and 2 contained 0.15 weight percent of phenolic antioxidant sold under the trade name Irganox ® 1076 by B.F. Goodrich. Examples A, 1 and 2 contained 0.01 weight percent phosphite antioxidant Irgafos ® 168 which is tris(2,4-di-t-butyl)phosphite sold by BFGoodrich. Examples A, 1 and 2 contained 0.5 weight percent of a lube which is a polyolefin lube sold by Quantum Chemicals, Inc. as Quantum 300P.

The blends of examples A, 1 and 2 were compounded at 480° F and 200 rpm on a 28 mm Wernes Pfleiderer twin screw extruder and then the dried blends were injection molded at 500° C. with 150° F. mold temperatures.

What is claimed is:

1. A reduced gloss thermoplastic composition consisting of:
    (a) an aromatic polycarbonate present at a level of from 10 to 85 weight percent based on the total weight of the composition;
    (b) a phosphate flame retardant present at a level of from 1 to 25 weight percent based on the total weight of the composition;
    (c) a hydroxy functional graft polymer present at a level of from 5 to 60 weight percent based on the total weight of the composition, said hydroxy functional graft polymer being formed by grafting monomers consisting of a monovinyl aromatic monomer, a hydroxy alkyl (meth)acrylate monomer and at least one ethylenically unsaturated nitrile onto a diene rubber substrate.

2. A composition as claimed on claim 1 wherein said aromatic polycarbonate is a bisphenol-A polycarbonate resin, and said diene rubber substrate comprises from between 50 and 100 weight percent 1,3 butadiene based on the total weight of the substrate.

3. A composition as claimed in claim 1 wherein said monovinyl aromatic monomer is styrene and said ethylenically unsaturated nitrile is acrylonitrile.

4. A composition as claimed in claim 1 wherein said aromatic polycarbonate is present at a level of 60 to 75 percent by weight based on the total weight of the composition, said phosphate flame retardant being present at a level of from 5 to 10 weight percent based on the total weight of the composition, and said hydroxy functional graft copolymer being present at a level of from 10 to 25 weight percent based on the total weight of the composition.

5. A composition as claimed in claim 1 wherein said graft polymer is formed by grafting styrene, hydroxy ethyl methacrylate and acrylonitrile onto a diene rubber substrate.

6. A composition as claimed in claim 5 wherein said hydroxy ethyl methacrylate is present at a level of from 1 to 20 percent by weight based on the total weight of the hydroxy functional graft polymer.

7. A reduced gloss thermoplastic composition consisting of:
    (a) an aromatic polycarbonate resin present at a level of from 10 to 85 weight percent based on the total weight of the composition;

(b) a phosphate flame retardant present at a level of from 1 to 25 weight percent based on the total weight of the composition;
(c) an amount of a hydroxy functional graft polymer sufficient to reduce the gloss of said composition, said graft polymer being formed by grafting monomers consisting of a hydroxy vinyl monomer, a monovinyl aromatic monomer and at least one ethylenically unsaturated nitrile onto a diene rubber substrate.

* * * * *